Dec. 17, 1946.  S. SOCHACZEWSKI  2,412,697
WHEELED CARRIER
Filed Dec. 15, 1943
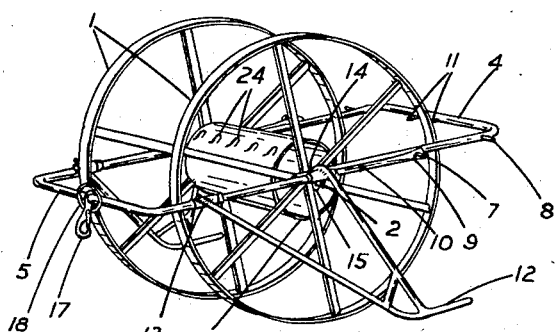
FIG.1.
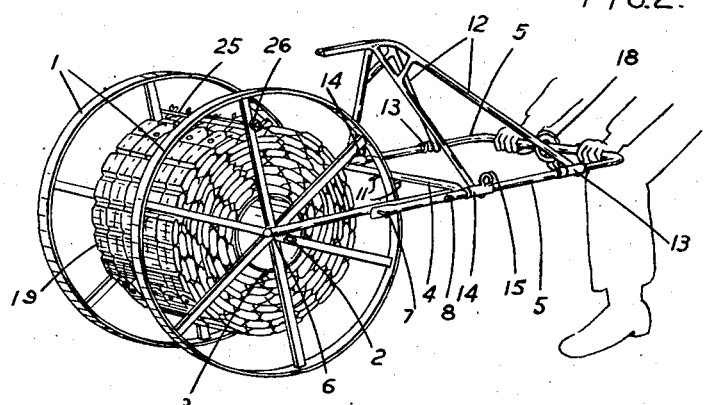
FIG.2.
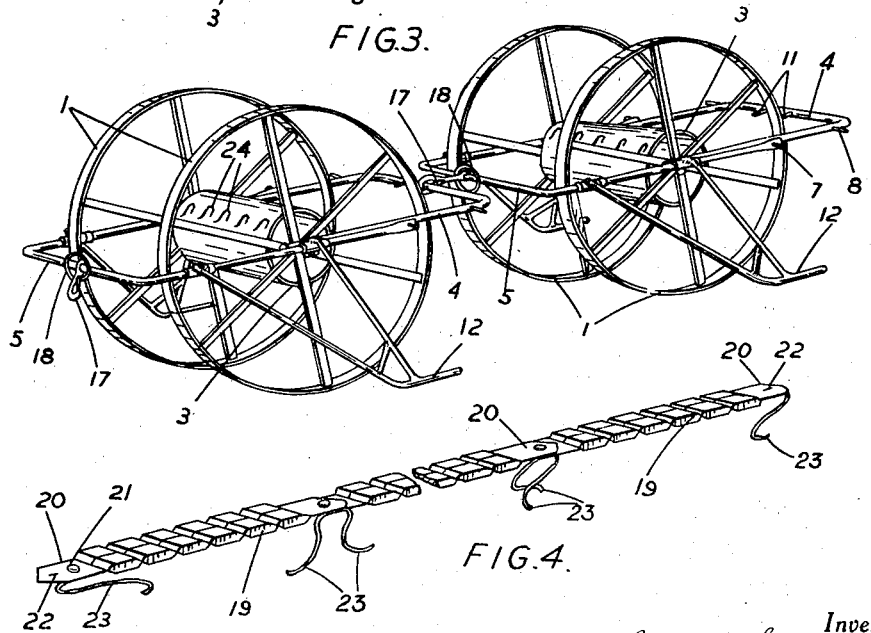
FIG.3.
FIG.4.
Inventor
Stanislaw Sochaczewski
By
A. Knight Croad
Attorney Patented Dec. 17, 1946

2,412,697

UNITED STATES PATENT OFFICE 2,412,697

WHEELED CARRIER

Stanislaw Sochaczewski, London, England

Application December 15, 1943, Serial No. 514,337
In Great Britain July 15, 1943

6 Claims. (Cl. 242—94)

This invention relates to wheeled carriers.

The object of the invention is to provide a carrier which can be manually propelled or which can be readily coupled together in numbers for hauling by a motor vehicle, a particular application of the invention being to a carrier for ammunition of small calibre, e. g., for small arms, automatic weapons and the like, such as is frequently packed in bandoleers and belts.

One form of carrier according to the invention is illustrated in the accompanying drawing, wherein—

Figure 1 is a perspective view of the complete carrier when not in use;

Figure 2 is a perspective view of the carrier loaded with ammunition belts and ready for manual propulsion;

Figure 3 illustrates how the carriers may be coupled together in tandem for mechanical propulsion; and Figure 4 is a detail view illustrating how the bandoleers are connected together to form a long belt for winding on the carrier.

Referring first to Figure 1 of the drawing, the carrier comprises two wheels 1, 1, fixedly mounted on the ends of an axle 2 passing through a hub or cylinder 3 the ends of which are welded to the spokes of the wheels 1, 1. The ends of the axle also carry a rectangular frame comprising two U-shaped parts 4, 5, of which part 4 is furnished at each of its two ends with a sleeve 6 loosely engaging the end of the axle, and, along each of its sides with two pins 7, 8, adapted to engage respectively in apertures 9, 10, in the two side arms of the part 5. The end member of the part 4 has two inwardly projecting pins 11, 11, the purpose of which will be described hereafter. The part 5 carries two skid-like parts 12, 12, the lowest parts of which in the position shown in Figure 1 are a little above the ground. These skids are slidably mounted on the frame part 5 by means of sleeves 13, 14, engaging the side arms of the frame, the sleeves 13, 14 being welded to the skids 12. Each sleeve 14 is provided with two slots. The eyelets, in the position shown in Figure 1, engage the ends of the axle 2 and each eyelet 15 is engaged by one of the slots in one of the sleeves 14. A ring 16 is welded on the end of the frame part 5 and a coupling hook 17 loosely mounted on the frame is confined by the ring 18.

Figure 4 illustrates an ammunition band made up by connecting a number of cartridge bandoleers together. The bandoleers 19 are formed at both ends with flaps 20 carrying a button 21 and buttonhole 22 and a tie 23. The bandoleers are connected up by passing the button 21 of one flap 20 through the buttonhole 22 of another flap 20. Five of the bands thus obtained can be connected to the hub 3 by engaging the free buttonholes 22 respectively at the ends of the bands with corresponding hooks 24 provided in a row on the hub, and can be wound thereon by rotating the wheels and hub. The outer ends of the bands can then be connected by ties 23 with a bar 25 having enlarged ends 26 which can be engaged against the spokes of the wheels 1, as clearly shown in Figure 2.

In order to use the frame part 5 as a handle as shown in Figure 2 the eyelets 15 are sprung off the ends of the axle 2 and the sleeves 13, 14 are shifted axially to disengage the sleeves 14 from the eyelets 15. Then, the part 5 is rotated around the pins 7 until it is in alignment with the part 4 whereupon the pins 8 are engaged respectively in the apertures 10, the skids 12 being swung towards each other on top of the frame and then shifted axially to the position shown in Fig. 2, in which the other slots in the sleeves 14 engage the eyelets 15. The frame 4, 5 can now be used as a rigid handle in the usual way, the handle being pivotally mounted on the axle 2. In order to restore the part 5 to the position shown in Figure 1 the side arms of part 5 are pressed outwards to release the pins 8 from the apertures, and the part 5 swung back around the pivotal connections formed by the pins 7 engaging the apertures 9 into the position of Figure 1, the eyelets 15 being re-engaged over the ends of the axle 2. In this position a number of carriers can be coupled in tandem by engaging the hook 17 (which has a safety catch) of one carrier over the cross bar of the part 4, between the two pins 11 thereon, as shown in Figure 3. The assembly can then be coupled up to a motor vehicle. The skids 12 do not normally touch the ground and are provided to prevent overturning of the carriers in the case of bumpy ground, sudden turns and the like.

A wheeled carrier made according to the invention is simple and cheap to construct, takes up little room, can be easily packed for storage or transport in quantity, and is readily adaptable for manual or power propulsion.

What I claim is:

1. A wheeled carrier comprising a pair of wheels, an axle connecting said wheels and projecting at both ends a short distance beyond the wheels, a first U-shaped frame element including two parallel legs spaced a distance slightly in excess of that between the outer faces of the wheels, said legs having a length greater than the wheel radius and being pivoted at their ends to the projecting axle ends, a second U-shaped frame element including two parallel legs spaced a distance slightly exceeding that between the legs of said first mentioned frame element and having a length exceeding that of the legs of said first frame element, said legs of said second frame element being pivoted at their free ends to the legs of said first frame element at points about halfway of the length of the latter to be swingable about an axis parallel to the wheel axle, means to secure said second frame element rigidly relative to said first frame element in a position in which the two elements are disposed in substantially the same plane on opposite sides of the axle so as to form a rigid rectangular frame around the carrier pivoted to the axle thereof, and cooperating means on the legs of said two frame elements, respectively, for securing the two frame elements rigidly together in an alternative position in which the two elements are disposed in substantially the same plane on the same side of the axle whereby the second frame element serves as a handle for manually propelling and guiding the carrier.

2. A wheeled carrier, as claimed in claim 1, in which the legs of said second frame element are resilient and said means for securing said second frame element relative to said first frame element in said first position includes eyelets on the legs of said second frame element at a distance from their free ends equal to the distance of said pivot point from the axle, said eyelets being formed and arranged to be sprung on the outer ends of said axle, said means for securing said frame elements rigidly together in said second position including pins projecting from the legs of one frame element for engagement into holes provided in the legs of the other frame element.

3. A wheeled carrier, as claimed in claim 1, including a cylindrical hub surrounding said axle and fixedly connected at its ends to said wheels, and means provided on said hub for connecting a load thereto.

4. A wheeled carrier, as claimed in claim 1, including two skid like frame members for stabilizing the carrier when travelling, said frame members being attached to the legs of one of said frame elements so as to extend substantially outwardly and downwardly from each wheel to a plane a short distance above the ground when said frame elements are secured in said first position and the rectangular frame formed by said elements is maintained in a substantially horizontal plane.

5. A wheeled carrier, as claimed in claim 1, including two skid like frame members for stabilizing the carrier when travelling, said frame members being pivotally attached to the legs of one of said frame elements for rocking movement about the longitudinal axes of said legs, respectively, means for securing each frame member relative to the leg to which it is attached in an operative position in which it extends substantially outwardly and downwardly from the adjacent wheel to a plane a short distance above the ground when said frame elements are secured in said first position and the rectangular frame formed by said elements is maintained in a substantially horizontal plane, and means for securing each frame member relative to the leg to which it is attached in an inoperative position in which it extends substantially inwardly and upwardly from such leg when said frame elements are secured together in their second position and maintained in a substantially horizontal plane.

6. A wheeled carrier, as claimed in claim 1, including a hook on one of said frame elements whereby a number of carriers with their frame elements secured in said first position can be coupled together in tandem by engaging the hook on one rectangular frame with the unhooked end of another rectangular frame.

STANISLAW SOCHACZEWSKI.